United States Patent
Fanning

(12) 
(10) Patent No.: US 6,904,499 B2
(45) Date of Patent: Jun. 7, 2005

(54) CONTROLLING CACHE MEMORY IN EXTERNAL CHIPSET USING PROCESSOR

(75) Inventor: Blaise B. Fanning, El Dorado Hills, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/822,643

(22) Filed: Mar. 30, 2001

(65) Prior Publication Data

US 2002/0144064 A1 Oct. 3, 2002

(51) Int. Cl.[7] ............................................. G06F 12/08
(52) U.S. Cl. ..................... 711/122; 711/119; 711/141
(58) Field of Search ................................. 711/119, 122, 711/135, 141, 146

(56) References Cited

U.S. PATENT DOCUMENTS

| | | | | | |
|---|---|---|---|---|---|
| 5,903,908 A | * | 5/1999 | Singh et al. | ................ | 711/122 |
| 5,963,978 A | * | 10/1999 | Feiste | ........................ | 711/158 |
| 6,047,348 A | * | 4/2000 | Lentz et al. | ................ | 710/307 |
| 6,192,451 B1 | * | 2/2001 | Arimilli et al. | ............ | 711/141 |
| 6,237,064 B1 | * | 5/2001 | Kumar et al. | ............... | 711/122 |
| 6,438,657 B1 | * | 8/2002 | Gilda | ........................ | 711/140 |
| 6,487,639 B1 | * | 11/2002 | Lipasti | ....................... | 711/137 |
| 6,629,218 B2 | * | 9/2003 | Cho | ........................... | 711/154 |

* cited by examiner

*Primary Examiner*—Gary J Portka
(74) *Attorney, Agent, or Firm*—Blakely, Sokoloff, Taylor & Zafman LLP

(57) ABSTRACT

The present invention is a method and apparatus to control cache. A processor cache unit processes a cache access request from a processor core of a processor. The processor cache unit includes a processor cache controller and a processor cache. A chipset cache controller controls a chipset cache located in a chipset in response to the cache access request from the processor core. The chipset is coupled to the processor via a bus.

32 Claims, 4 Drawing Sheets

FIG. 3

CACHE ACCESS TYPE = READ

| CACHE VALID INDICATOR | FLUSH INDICATOR | SET IDENTIFIER | OPERATION PERFORMED BY CHIPSET |
|---|---|---|---|
| NEGATED | NEGATED | SSSS | READ DATA FROM MEMORY INTO CACHE SET SSSS IN CHIPSET. DATA IS SUBSEQUENTLY RETURNED TO PROCESSOR |
| NEGATED | ASSERTED | SSSS | READ DATA FROM MEMORY INTO CACHE SET SSSS IN CHIPSET. FLUSH EXISTING DATA IN CACHE SET SSSS TO MEMORY. DATA IS SUBSEQUENTLY RETURNED TO PROCESSOR |
| ASSERTED | NEGATED | SSSS | READ DATA FROM CACHE SET SSSS IN CHIPSET AND RETURN DATA TO PROCESOR |
| ASSERTED | ASSERTED | SSSS | NOT VALID |

FIG. 4

CACHE ACCESS TYPE = WRITE

| CACHE VALID INDICATOR | FLUSH INDICATOR | SET IDENTIFIER | OPERATION PERFORMED BY CHIPSET |
|---|---|---|---|
| NEGATED | NEGATED | SSSS | WRITE DATA FROM PROCESSOR TO CACHE SET SSSS IN CHIPSET AND IMMEDIATELY TO MEMORY. PUT LINE INTO CLEAN STATE |
| NEGATED | ASSERTED | SSSS | WRITE DATA FROM PROCESSOR TO CACHE SET SSSS IN CHIPSET. FLUSH EXISTING DATA AT CHIPSET TO MEMORY. WRITE DATA IMMEDIATELY TO MEMORY |
| ASSERTED | NEGATED | SSSS | WRITE DATA FROM PROCESSOR TO CACHE SET SSSS IN CHIPSET |
| ASSERTED | ASSERTED | SSSS | WRITE DATA FROM PROCESSOR TO CACHE SET SSSS IN CHIPSET. FLUSH EXISTING DATA TO MEMORY |

CONTROLLING CACHE MEMORY IN EXTERNAL CHIPSET USING PROCESSOR

BACKGROUND

1. Field of the Invention

This invention relates to microprocessors. In particular, the invention relates to cache memory.

2. Background of the Invention

Practical chipset caches need to exceed the size of the caches in the processor with which they are paired in order to achieve substantial performance improvements. Desktop processors may be expected to deploy internal caches that can retain up to several megabytes (MB) of information. Consequently, the chipset caches may need to contain up to ten times that amount (e.g., 8 MB) of data storage. With this enormous amount of storage, the control tasks including the cache tag store would be proportionally complex.

Existing techniques integrate the control functions of the caches within the same chipset. Although these techniques may be adequate for small to medium cache size (e.g., less than 1 MB), for large cache sizes, these techniques may lead to inefficiency use of resources and prolonged design cycle. Chipsets are often designed on a standard cell or gate array process. Complex custom logic blocks may be difficult to integrate into chipset designs.

BRIEF DESCRIPTION OF THE DRAWINGS

The features and advantages of the present invention will become apparent from the following detailed description of the present invention in which:

FIG. 3 is a diagram illustrating operations performed by the chipset for a read access type according to one embodiment of the invention.

FIG. 4 is a diagram illustrating operations performed by the chipset for a write access type according to one embodiment of the invention.

DETAILED DESCRIPTION OF THE INVENTION

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention. It is also noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 1:
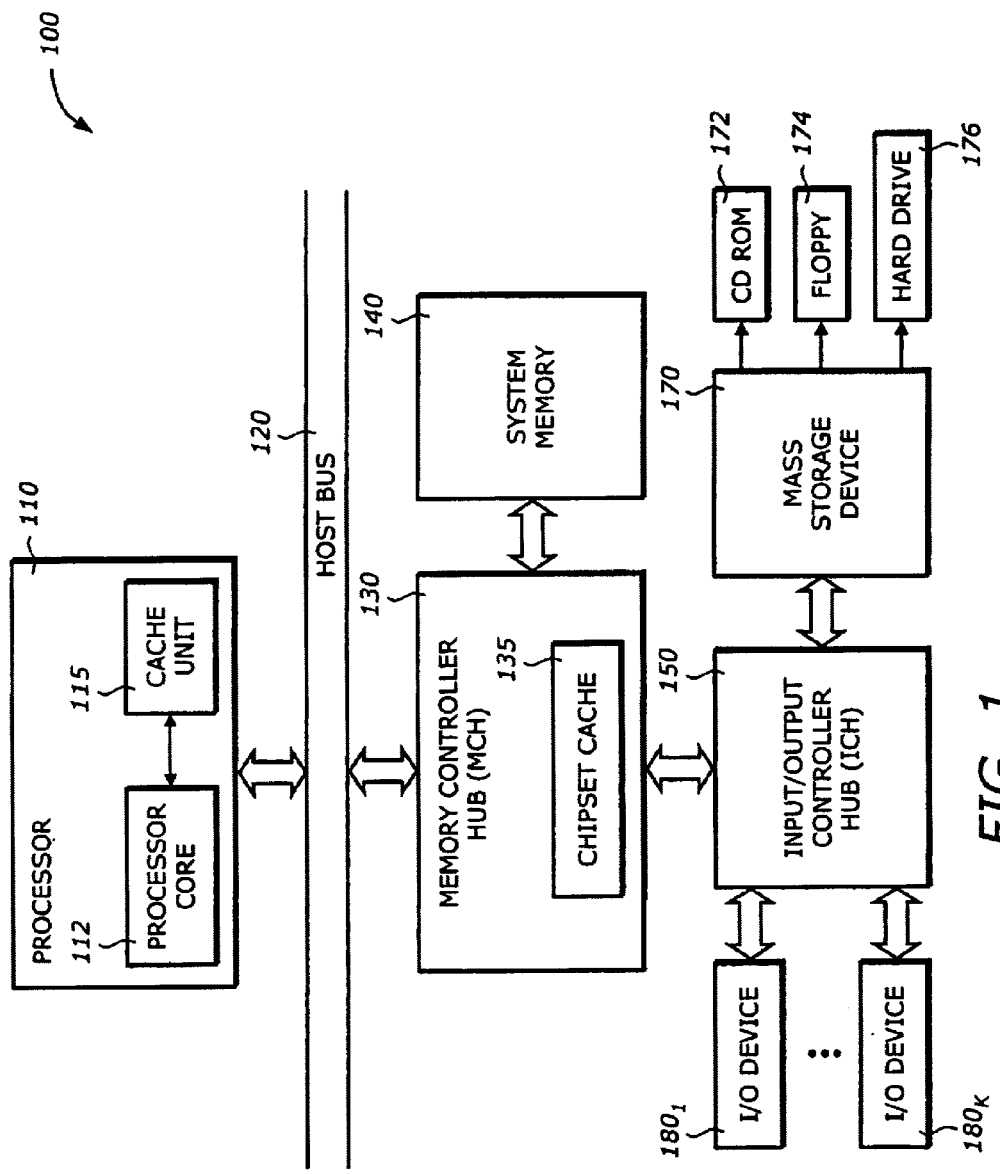
FIG. 1 is a diagram illustrating a system in which one embodiment of the invention can be practiced.

FIG. 1 is a diagram illustrating a computer system 100 in which one embodiment of the invention can be practiced.

The computer system 100 includes a processor 110, a host bus 120, a memory control hub (MCH) 130, a system memory 140, an input/output control hub (ICH) 150, a mass storage device 170, and input/output devices $180_1$ to $180_K$.

The processor 110 represents a central processing unit of any type of architecture, such as embedded processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The processor 110 includes a processor core 112 and a cache unit 115. The processor core 112 performs necessary processor operations such as fetching instruction and data, decoding instructions, and executing the instructions. The cache unit 115 provides an internal cache (e.g., level I) or processor cache and a control mechanism for an external cache (e.g., level II). The cache unit 115 is described in FIG. 2.

The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc. The MCH 130 includes a chipset cache 135. The chipset cache 135 is the external cache (e.g., level II) to store cache information. By moving the control functions including the cache tag store out of the MCH 130 and into the processor 110, significant saving in hardware can be achieved. In addition, the processor 110 can perform control functions and maintain cache coherence logic in a more efficient manner.

The system memory 140 stores system code and data. The system memory 140 is typically implemented with dynamic random access memory (DRAM) or static random access memory (SRAM). The system memory may include program code or code segments implementing one embodiment of the invention. The system memory 140 may also include other programs or data which are not shown depending on the various embodiments of the invention. The instruction code stored in the memory 140, when executed by the processor 110, causes the processor to perform the tasks or operations as described in the following.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage controller and interface, low pin count (LPC) interface, etc.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Figure 2:
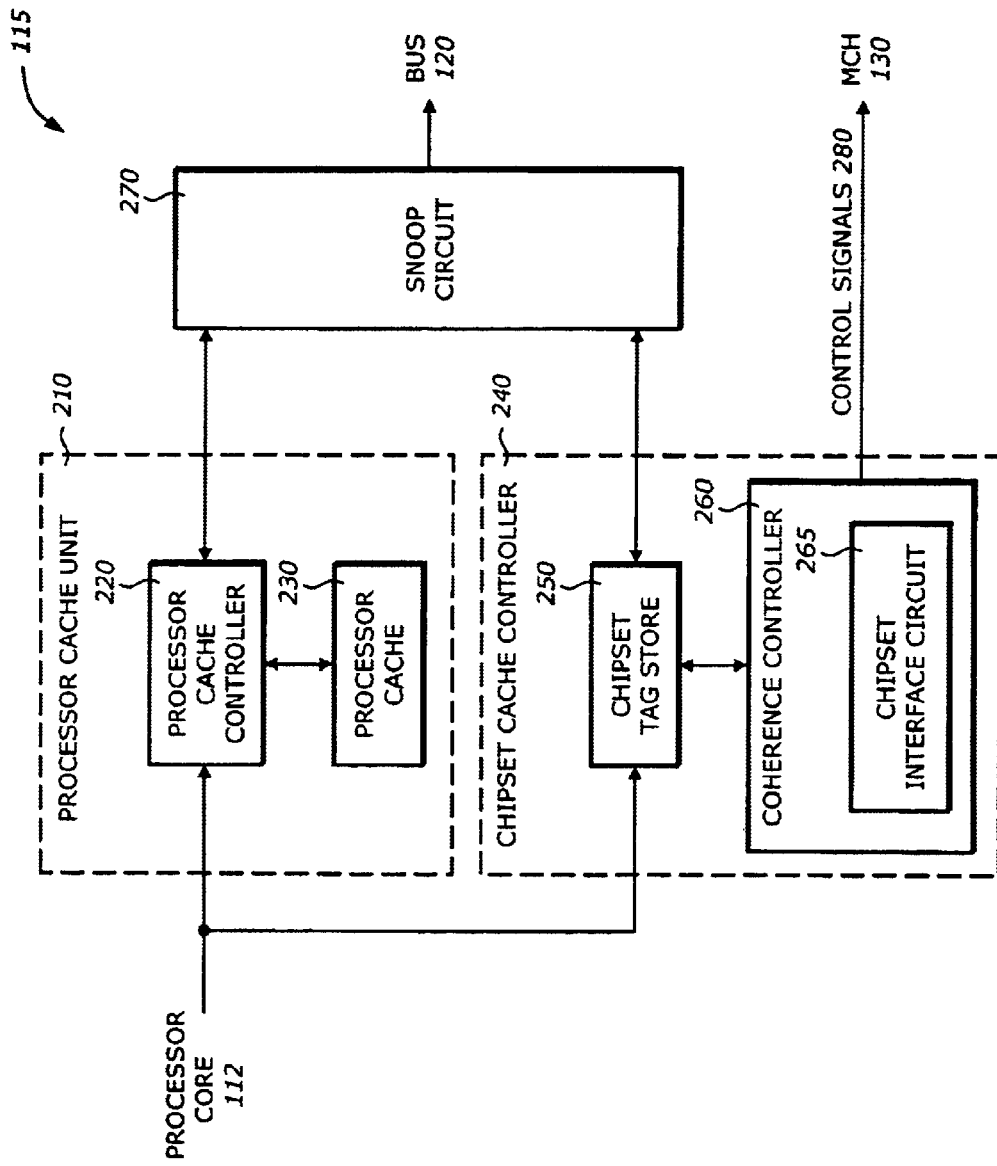
FIG. 2 is a diagram illustrating a cache unit shown in FIG. 1 according to one embodiment of the invention.

FIG. 2 is a diagram illustrating the cache unit 115 shown in FIG. 1 according to one embodiment of the invention. The cache unit 115 includes a processor cache unit 210, a chipset cache controller 240, and a snoop circuit 270.

The processor cache unit 210 maintains the internal cache (e.g., level I) for the processor 110 and processes a cache access request from the processor core 112. The processor cache unit 210 includes a processor cache controller 220 and a processor cache 230. The processor cache request may be a read or a write request. The processor cache unit 210 also interfaces with the snoop circuit 270 to manage and maintain cache coherency for the system. The processor cache controller 220 controls the processor cache 230. The processor cache controller 220 follows a cache coherence protocol such as the Modified, Exclusive, Share, and Invalidate (MESI) protocol. Under this protocol, the processor cache controller 220 keeps track of state of a cache line and update the state according to cache conditions, previous state, and access request. The state of a cache line may be one of a modified state, an exclusive state, a share state, and an invalidated state as well known in the art. The processor cache controller 220 includes a processor cache tag store to store tags associated with the cache lines in the processor cache 230. The processor cache 230 stores cache lines requested by the processor core 112. The cache lines may correspond to instruction code or data.

The chipset cache controller 240 controls the chipset cache 135 located in the chipset MCH 130 (FIG. 1) in response to the cache access request from the processor core 112. By implementing the control functions of the external cache inside the processor 110, the cache management and coherence control can be performed efficiently. The chipset cache controller 240 includes a chipset cache tag store 250 and a coherence controller 260. The chipset cache tag store 250 stores the tags associated with the cache lines in the chipset cache 135. The coherence controller 260 maintains cache coherency among the processor cache 230, the chipset cache 135, and the memory 140 according to a coherence protocol. In one embodiment, the coherence protocol is the MESI protocol as discussed above. The coherence controller 260 includes a chipset interface circuit 265 to send control signals 280 to the chipset MCH 130 according to the cache state and the type of the cache access request (e.g., read access, write access). The control signals 280 specify an operation performed by the chipset 130.

The control signals 280 include at least a set identifier, a cache valid indicator, and a flush indicator. The set identifier identifies a cache set in the chipset cache 135 corresponding to the cache access request. The cache valid indicator is used to indicate if the corresponding cache line is valid. The cache valid indicator is asserted when the cache line is valid, and negated, or not asserted, when the cache line is not valid. In one embodiment, the cache valid indicator is one-bit which is HIGH when asserted and LOW when negated. The flush indicator is used to indicate if the corresponding cache line is flushed. It is asserted when the cache line is flushed, and negated, or not asserted when the cache line is not flushed. In one embodiment, the flush indicator is one-bit which is HIGH when asserted and LOW when negated.

The control signals may be sent to the chipset MCH 130 via some pins on the processor 110 along with the standard address cycle during the request and/or snoop phase. Suppose there are sixteen sets in the chipset cache 135, then the set identifier is 4-bit to specify one of the sixteen sets. The total number of control signals 280 is then six (four for the set identifier and two for the cache valid indicator and the flush indicator). These six signals can be sent out on three pins that are double-pumped. They may also be whispered to the chipset 130 by quad-pumping the address communication. Double and quad pumpings refer to the clocking scheme that strobes the data twice and four times, respectively, faster than the bus clock signal.

The snoop circuit 270 snoops the bus 120 to monitor any address information sent by other bus masters in the system as part of the system cache coherency management. The snoop circuit 270 checks if an address snooped on the bus 120 matches with one of entries in the chipset cache tag store 250. The snoop circuit 270 may also forward the snooped address to the processor cache unit 210 for cache coherence maintenance. The set identifier in the control signals may also specify the cache set corresponding to the one of the entries that matches the address snooped on the bus. This set identifier may be broadcast on the bus 120 during the request phase or other appropriate phase(s) so that other bus masters may perform their own cache coherency management tasks. Additional information such as cache hit or miss may also be broadcast along with the set identifier either on the bus 120 or via separate HIT signal.

FIG. 3 is a diagram illustrating operations performed by the chipset for a read access type according to one embodiment of the invention.

When the access request is a read request, the chipset 130 (FIG. 1) performs the following operations according to the control signals. There are essentially four cases corresponding to four different combinations of the cache valid indicator and the flush indicator. In all cases, the set identifier ssss refers to the set number of the cache set in the chipset cache 135 (FIG. 1).

Case 1: The valid indicator is negated and the flush indicator is negated. In this case, since the processor 110 requests to read a data that is not valid in the chipset cache 135, i.e., the read access results in a cache miss, the chipset 130 has to fetch that data from the memory 140. The chipset 130 reads data from the memory 140 into the cache set ssss. Subsequently, the chipset 130 sends the read data to the processor 110. This can be done at the same time when the chipset reads the data from the memory 140. Since the flush indicator is negated, no flush operation is performed.

Case 2: The valid indicator is negated and the flush indicator is asserted. Similar to case 1, this case results in a cache miss, the chipset 130 reads data from the memory 140 into the cache set ssss. The existing data corresponding to the cache set is flushed to the memory 140 in the whispered address. Subsequently, the chipset 130 sends the read data to the processor 110. This can be done at the same time when the chipset reads the data from the memory 140.

Case 3: The valid indicator is asserted and the flush indicator is negated. In this case, the processor 110 requests to read a valid data in the chipset cache, resulting in a cache hit, the chipset 130 reads data from the cache set ssss in the chipset cache 135 and sends it to the processor 110.

Case 4: The valid indicator is asserted and the flush indicator is asserted. In this case, the processor 110 requests to read a valid data in the chipset cache, resulting in a cache hit and requests to flush the data. This condition is not a valid condition and may correspond to an error. The chipset 130 may generate a error condition or do nothing.

FIG. 4 is a diagram illustrating operations performed by the chipset for a write access type according to one embodiment of the invention.

Similar to the read access type, there are four cases corresponding to four possible combinations of the valid indicator and the flush indicator. Again ssss refers to the cache set in the chipset cache 135.

Case 1: The valid indicator is negated and the flush indicator is negated. In this case, since the processor 110 requests to write a data that is not valid in the chipset cache 135, i.e., the write access results in a cache miss, the chipset 130 has to write the data into the cache set ssss. The chipset 130 then writes the data to the memory 140 in a write through policy to ensure that the memory 140 contains the same data for coherency. Since this is a new data, the corresponding cache line is marked clean.

Case 2: The valid indicator is negated and the flush indicator is asserted. Similar to case 1, this case results in a cache miss, the chipset 130 writes the data into the cache set ssss. The existing data corresponding to the cache set is flushed to the memory 140 in the whispered address. The chipset 130 then writes the data to the memory 140 in a write through policy to ensure that the memory 140 contains the same data for coherency.

Case 3: The valid indicator is asserted and the flush indicator is negated. In this case, the processor 110 requests to write a valid data in the chipset cache, resulting in a cache hit, the chipset 130 writes the data into the cache set ssss. The data should not be written back to the memory 140.

Case 4: The valid indicator is asserted and the flush indicator is asserted. In this case, the processor 110 requests to write a valid data in the chipset cache, resulting in a cache hit and requests to flush the data. the chipset 130 writes the data into the cache set ssss. The data should not be written back to the memory 140. The existing data corresponding to the cache set is flushed to the memory 140 in the whispered address While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. An apparatus comprising:
    a processor cache unit to process a cache access request from a processor core of a processor, the processor cache unit including a processor cache controller and a processor cache; and
    a chipset cache controller internal and coupled to the processor cache unit internally to the processor to control a chipset cache located in a chipset via control signals that are double-pumped or quad-pumped in response to the cache access request from the processor core, the chipset being a memory controller external and coupled to the processor via a bus.

2. The apparatus of claim 1 wherein the chipset cache controller comprises:
    a chipset cache tag store to store tags corresponding to cache lines of the chipset cache; and
    a coherency controller coupled to the chipset cache tag store to maintain cache coherency among the processor cache, the chipset cache, and a memory, according to a coherence protocol.

3. The apparatus of claim 2 wherein the coherency protocol is a modified, exclusive, share, and invalidated (MESI) protocol.

4. The apparatus of claim 3 wherein the coherence controller comprises:
    a chipset interface circuit to send the control signals to the chipset according to cache state and type of the cache access request, the control signals specifying an operation performed by the chipset.

5. The apparatus of claim 4 wherein the control signals include at least a set identifier for a cache set in the chipset cache corresponding to the cache access request, a cache valid indicator asserted when a cache line in the cache set is valid, and a flush indicator asserted when the cache line is flushed.

6. The apparatus of claim 5 wherein when the type of the cache access request is a read request and the cache valid indicator is not asserted, the operation includes one of a transfer of a data read from the memory to the cache set in the chipset cache and a transfer of a data read from the memory to the processor.

7. The apparatus of claim 6 wherein when the flush indicator is asserted, the operation further includes a flushing of existing data at the cache set.

8. The apparatus of claim 4 wherein when the type of the cache access request is a read request and the cache valid indicator is asserted, the operation includes a transfer of a data read from the cache set to the processor.

9. The apparatus of claim 4 wherein when the type of the cache access request is a write request, the operation includes a transfer of a data from the processor to the cache set in the chipset cache.

10. The apparatus of claim 9 wherein when the cache valid indicator is not asserted, the operation further includes a transfer of the data from the processor to the memory.

11. The apparatus of claim 9 wherein when the flush indicator is asserted, the operation further includes a flushing of existing data at the cache set.

12. The apparatus of claim 5 further comprising:
    a snoop circuit coupled to the chipset cache tag store to check if an address snooped on the bus matches with one of entries in the chipset cache tag store.

13. The apparatus of claim 12 wherein the set identifier specifies the cache set corresponding to the one of the entries that matches the address snooped on the bus.

14. A method comprising:
    processing a cache access request from a processor core of a processor by a processor cache unit, the processor cache unit including a processor cache controller and a processor cache; and
    controlling a chipset cache located in a chipset by a chipset cache controller internal to the processor via control signals that are double-pumped or quad-pumped in response to the cache access request from the processor core, the chipset being a memory controller external and coupled to the processor via a bus.

15. The method of claim 14 wherein controlling the chipset cache comprises:

storing tags corresponding to cache lines of the chipset cache in a chipset cachetag store; and maintaining cache coherency among the processor cache, the chipset cache, and a memory, according to a coherence protocol.

16. The method of claim 15 wherein the coherency protocol is a modified, exclusive, share, and invalidated (MESI) protocol.

17. The method of claim 16 wherein maintaining cache coherency comprises:

sending the control signals to the chipset according to cache state and type of the cache access request, the control signals specifying an operation performed by the chipset.

18. The method of claim 17 wherein the control signals include at least a set identifier for a cache set in the chipset cache corresponding to the cache access request, a cache valid indicator asserted when a cache line in the cache set is valid, and a flush indicator asserted when the cache line is flushed.

19. The method of claim 18 wherein when the type of the cache access request is a read request and the cache valid indicator is not asserted, the operation includes one of a transfer of a data read from the memory to the cache set in the chipset cache and a transfer of a data read from the memory to the processor.

20. The method of claim 19 wherein when the flush indicator is asserted, the operation further includes a flushing of existing data at the cache set.

21. The method of claim 17 wherein when the type of the cache access request is a read request and the cache valid indicator is asserted, the operation includes a transfer of a data read from the cache set to the processor.

22. The method of claim 17 wherein when the type of the cache access request is a write request, the operation includes a transfer of a data from the processor to the cache set in the chipset cache.

23. The method of claim 22 wherein when the cache valid indicator is not asserted, the operation further includes a transfer of the data from the processor to the memory.

24. The method of claim 22 wherein when the flush indicator is asserted, the operation further includes a flushing of existing data at the cache set.

25. The method of claim 18 further comprising:

checking if an address snooped on the bus matches with one of entries in the chipset cache tag store.

26. The method of claim 25 wherein the set identifier specifies the cache set corresponding to the one of the entries that matches the address snooped on the bus.

27. A system comprising:

a memory to store data;

a chipset coupled to memory having a chipset cache, the chipset being a memory controller; and a processor coupled to the memory and the chipset via a bus, the processor including a processor core and a cache unit, the cache unit comprising:

a processor cache unit to process a cache access request from the processor core, the processor cache unit including a processor cache controller and a processor cache, and a chipset cache controller coupled to the processor cache unit to control the chipset cache via control signals that are double-pumped or quad-pumped in response to the cache access request from the processor core.

28. The system of claim 27 wherein the chipset cache controller comprises:

a chipset cache tag store to store tags corresponding to cache lines of the chipset cache; and a coherency controller coupled to the chipset cache tag store to maintain cache coherency among the processor cache, the chipset cache, and a memory, according to a coherence protocol.

29. The system of claim 28 wherein the coherency protocol is a modified, exclusive, share, and invalidated (MESI) protocol.

30. The system of claim 29 wherein the coherence controller comprises:

a chipset interface circuit to send the control signals to the chipset according to cache state and type of the cache access request, the control signals specifying an operation performed by the chipset.

31. The system of claim 30 wherein the control signals include at least a set identifier for a cache set in the chipset cache corresponding to the cache access request, a cache valid indicator asserted when a cache line in the cache set is valid, and a flush indicator asserted when the cache line is flushed.

32. The system of claim 31 wherein the cache unit further comprising:

a snoop circuit coupled to the chipset cache tag store to check if an address snooped on the bus matches with one of entries in the chipset cache tag store.

* * * * *